United States Patent
Cha et al.

(10) Patent No.: US 8,411,753 B2
(45) Date of Patent: Apr. 2, 2013

(54) COLOR SPACE SCALABLE VIDEO CODING AND DECODING METHOD AND APPARATUS FOR THE SAME

(75) Inventors: Sang-chang Cha, Hwaseong-si (KR); Manu Mathew, Suwon-si (KR); Kyo-hyuk Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2156 days.

(21) Appl. No.: 11/367,453

(22) Filed: Mar. 6, 2006

(65) Prior Publication Data

US 2006/0197777 A1    Sep. 7, 2006

Related U.S. Application Data

(60) Provisional application No. 60/658,166, filed on Mar. 4, 2005.

(30) Foreign Application Priority Data

Apr. 29, 2005   (KR) .................. 10-2005-0036289

(51) Int. Cl.
    *H04N 7/12*   (2006.01)
(52) U.S. Cl. .............. 375/240.18; 375/240.01; 375/295
(58) Field of Classification Search ............ 375/240.18, 375/240.01, 295, 316
    See application file for complete search history.

(56) References Cited

U.S. PATENT DOCUMENTS

| | | | | |
|---|---|---|---|---|
| 5,251,015 A | * | 10/1993 | Rumreich | 348/506 |
| 5,412,428 A | | 5/1995 | Tahara | |
| 5,623,310 A | * | 4/1997 | Kim | 348/394.1 |
| 5,778,100 A | * | 7/1998 | Chen et al. | 382/243 |
| 5,852,630 A | * | 12/1998 | Langberg et al. | 375/219 |
| 6,459,814 B1 | | 10/2002 | Li et al. | |
| 6,462,744 B1 | * | 10/2002 | Mochida et al. | 345/543 |
| 6,493,387 B1 | * | 12/2002 | Shin et al. | 375/240.1 |
| 6,614,442 B1 | | 9/2003 | Ouyang et al. | |
| 6,614,846 B1 | * | 9/2003 | Fujiwara et al. | 375/240.16 |
| 7,159,117 B2 | * | 1/2007 | Tanaka | 713/176 |
| 7,650,032 B2 | * | 1/2010 | Abe et al. | 382/166 |
| 7,826,537 B2 | * | 11/2010 | Zhang et al. | 375/240.27 |
| 2001/0026616 A1 | * | 10/2001 | Tanaka | 380/202 |
| 2002/0037046 A1 | * | 3/2002 | Schaar et al. | 375/240.2 |

(Continued)

FOREIGN PATENT DOCUMENTS

| | | |
|---|---|---|
| EP | 0594338 A2 | 4/1994 |
| EP | 0739139 A2 | 10/1996 |

(Continued)

OTHER PUBLICATIONS

Iain E.G. Richardson: "H. 264 and MPEG-4 Video Compression Video Coding for Next-generation Multimedia", pp. 188-197, England, John Wiley & Sons Ltd., 2003, par. 3.5.

(Continued)

*Primary Examiner* — Shuwang Liu
*Assistant Examiner* — Helene Tayong
(74) *Attorney, Agent, or Firm* — Sughrue Mion, PLLC

(57) ABSTRACT

A color space scalable video coding and decoding method and an apparatus for the same are disclosed that can adjust color components or color depth according to the performance of a decoder side. The color space scalable video coding method includes generating transform coefficients by removing the temporal redundancy and spatial redundancy of input video frames, quantizing the transform coefficients, generating a bit stream by entropy coding the quantized transform coefficients, and generating a color space scalable bit stream that includes the bit stream and position information of luminance data in the bit stream.

16 Claims, 10 Drawing Sheets

U.S. PATENT DOCUMENTS

| | | | |
|---|---|---|---|
| 2002/0090138 A1 | | 7/2002 | Hamanaka |
| 2002/0097408 A1* | | 7/2002 | Chang et al. .................. 358/1.6 |
| 2003/0103571 A1* | | 6/2003 | Meehan et al. ......... 375/240.27 |
| 2003/0164961 A1 | | 9/2003 | Daly |
| 2005/0232501 A1* | | 10/2005 | Mukerjee ..................... 382/239 |
| 2007/0153918 A1* | | 7/2007 | Rodriguez .............. 375/240.29 |

FOREIGN PATENT DOCUMENTS

| | | |
|---|---|---|
| KR | 94-007550 B1 | 8/1994 |
| KR | 10-1998-0074795 A | 11/1998 |
| KR | 1020020034709 A | 5/2002 |
| KR | 10-2004-0091667 A | 10/2004 |
| RU | 2215375 C2 | 10/2003 |
| WO | WO 98/27741 A1 | 6/1998 |
| WO | 99/39097 A1 | 8/1999 |
| WO | WO 00/57650 A1 | 9/2000 |
| WO | WO 01/06795 A1 | 1/2001 |
| WO | WO 02/21847 A1 | 3/2002 |

OTHER PUBLICATIONS

Lujun Yuan, et al., "Color Space Compatible Coding Framework for YUV422 Video Coding" IEEE III-185-188,2004.

Notification of Transmittal of the International Search Report and the Written Opinion of the International Searching Authority, or the Declaration for International Application No. PCT/KR2006/000690 mailed May 4, 2006 (including International Search Report and Written Opinion of the International Searching Authority).

MPEG-7 Overview (Version 10), ISO/IEC JTC1/SC29/WG11 N6828, Palma de Mallorca, Oct. 2004, "H.264 and MPEG-4 Video Compression Video Coding for Next-Generation Multimedia", Ian E.G. Richardson, England, J. Wiley & Sons Ltd., 2003 par. 5.5.

"Series H: Audiovisual and Multimedia Systems Infrastructure of audiovisual services—Coding of moving video" ITU-T Telecommunication Standardization Sector of ITU, May 2003, pp. 31, 62, 113-143.

Wang et al. "Implementation of H.264 FGS Coding," Inst. of Image Communication & Information Processing, Shanghai Jiaotong University, Shanghai, Feb. 2005, pp. 14-16.

\* cited by examiner

FIG. 2

| Position Information of Luminance Data | Motion Data | Luminance Data | Chrominance Data |
|---|---|---|---|
| 210 | 220 | 230 | 240 |

FIG. 3

| Position Information of i-th Layer Luminance Data | i-th Layer Motion Data | i-th Layer Luminance Data | i-th Layer Chrominance Data | Position Information of (i+1)-th Layer Luminance Data | (i+1)-th Layer Motion Data | (i+1)-th Layer Luminance Data | (i+1)-th Layer Chrominance Data |
|---|---|---|---|---|---|---|---|
| 310 | | 320 | 330 | 340 | | 350 | 360 |

FIG. 4

| Position Information of Luminance Data of All FGS Layers | Motion Data | First FGS Layer Luminance Data | First FGS Layer Chrominance Data | Second FGS Layer Luminance Data | Second FGS Layer Chrominance Data | Third FGS Layer Luminance Data | Third FGS Layer Chrominance Data |
|---|---|---|---|---|---|---|---|
| 410 | | 420 | 430 | 440 | 450 | 460 | 470 |

FIG. 5

| Position Information of Luminance Data of All FGS Layers | Motion Data | First FGS Layer Luminance Data | Second FGS Layer Luminance Data | Third FGS Layer Luminance Data | First FGS Layer Chrominance Data | Second FGS Layer Chrominance Data | Third FGS Layer Chrominance Data |
|---|---|---|---|---|---|---|---|
| 510 | | 520 | 530 | 540 | 550 | 560 | 570 |

COLOR SPACE SCALABLE VIDEO CODING AND DECODING METHOD AND APPARATUS FOR THE SAME

CROSS-REFERENCE TO RELATED APPLICATIONS

This application claims priority from Korean Patent Application No. 10-2005-0036289 filed on Apr. 29, 2005 in the Korean Intellectual Property Office, and U.S. Provisional patent application No. 60/658,166 filed on Mar. 4, 2005 in the United States Patent and Trademark Office, the disclosures of which are incorporated herein by reference in their entirety.

BACKGROUND OF THE INVENTION

1. Field of the Invention

The present invention relates to a color space scalable video coding and decoding method and an apparatus for the same, and more particularly, to a color space scalable video coding and decoding method and an apparatus for the same that can adjust color components or color depth according to the performance of a decoder side.

2. Description of the Prior Art

With the development of information and communication technologies, multimedia communications are increasing in addition to text and voice communications. The existing text-centered communication systems are insufficient to satisfy consumers' diverse desires, and thus multimedia services that can accommodate diverse forms of information such as text, images, music, and others, are increasing. Since multimedia data is large, mass storage media and wide bandwidths are required for storing and transmitting multimedia data. Accordingly, compression coding techniques are required to transmit multimedia data, which includes text, images and audio data.

The basic principle of data compression is to remove data redundancy. Data can be compressed by removing spatial redundancy such as the repetition of the same color or object in images, temporal redundancy such as little change in adjacent frames of a moving image or the continuous repetition of sounds in audio, and visual/perceptual redundancy, which considers human insensitivity to high frequencies. In a general video coding method, temporal redundancy is removed by temporal filtering based on motion compensation, and spatial redundancy is removed by a spatial transform.

In order to transmit multimedia after the redundancy has been removed, transmission media are required, the performances of which differ. Presently used transmission media have diverse transmission speeds. For example, an ultrahigh-speed communication network can transmit several tens of megabits of data per second and a mobile communication network has a transmission speed of 384 kilobits per second. In order to support the transmission media in such a transmission environment and to transmit multimedia with a transmission rate suitable for the transmission environment, a scalable video coding method is most suitable.

This scalable coding method makes it possible to adjust the resolution, the frame rate, the signal-to-noise ratio (SNR), and others of a video by truncating part of a pre-compressed bit stream in accordance with environmental conditions such as the transmission bit rate, the transmission error rate and system resources. With respect to such scalable video coding, MPEG-21 (Moving Picture Experts Group-21) Part-13 has already progressed its standardization work.

However, since the existing scalable video coding cannot provide scalability in a color space, even a display device that requires a grayscale image instead of a color image must receive and decode the color image, which is unnecessary and inefficient. Further, it is inefficient for a display device that is unable to display an image having a color depth of 24 bits to receive and decode a bit stream coded with a color depth of 24 bits and then truncate unnecessary bits from the decoded bit stream.

SUMMARY OF THE INVENTION

Accordingly, the present invention has been made to solve the above-mentioned problems occurring in the prior art, and an aspect of the present invention is to provide a color space scalable video coding and decoding method, in which an encoder can inform a decoder of the position of luminance data in a bit stream and the decoder can transform a color image into a grayscale image as needed.

Another aspect of the present invention is to provide a color space scalable video coding and decoding method, in which a decoder acquires information on a color depth capacity from a display device, removes bits that exceeds the color depth capacity supported by the display device, and decodes a bit stream.

Additional advantages, aspects and features of the invention will be set forth in part in the description which follows and in part will become apparent to those having ordinary skill in the art upon examination of the following or may be learned from practice of the invention.

In order to accomplish these aspects, there is provided a color space scalable video coding method, according to the present invention, which includes the steps of generating transform coefficients by removing the temporal redundancy and spatial redundancy of input video frames, quantizing the transform coefficients, generating a bit stream by entropy coding the quantized transform coefficients, and generating a color space scalable bit stream that includes the bit stream and position information of luminance data in the bit stream.

In another aspect of the present invention, there is provided a color space scalable video decoding method, which includes the steps of extracting position information of luminance data from a bit stream, generating a second bit stream that includes motion data and luminance data by truncating chrominance data from the bit stream according to the position information of the luminance data, and restoring video frames by decoding the second bit stream.

In still another aspect of the present invention, there is provided a color space scalable video coding method, which includes the steps of generating transform coefficients by removing the temporal redundancy and the spatial redundancy of input video frames, quantizing the transform coefficients, and generating a bit stream by entropy coding the quantized transform coefficients, wherein the number of bits of a color depth of the bit stream is increased in proportion to the level of the layer.

In still another aspect of the present invention, there is provided a color space scalable video decoding method, which includes the steps acquiring information on a color depth capacity from a display device, generating a second bit stream by truncating bits from an input bit stream that exceed the color depth capacity according to the information on the color depth capacity, and restoring video frames by decoding the second bit stream.

In still another aspect of the present invention, there is provided a color space scalable video encoder, which includes a temporal transform unit for removing the temporal redundancy of input video frames, a spatial transform unit for removing the spatial redundancy of the input video frames, a quantization unit for quantizing the transform coefficients generated by the temporal transform unit and the spatial transform unit, an entropy coding unit for performing entropy coding of the quantized transform coefficients, and a color space scalable bit stream generation unit for generating a color space scalable bit stream that includes a bit stream generated by the entropy coding unit, and position information of luminance data in the bit stream.

In still another aspect of the present invention, there is provided a color space scalable video decoder, which includes a bit stream preprocessing unit for extracting position information of luminance data from a bit stream, and generating a second bit stream that includes motion data and luminance data by truncating chrominance data from the bit stream according to the position information of the luminance data, an entropy decoding unit for decoding the second bit stream, an inverse quantization unit for generating transform coefficients by performing an inverse quantization on the decoded second bit stream, an inverse spatial transform unit for restoring a residual signal by performing an inverse spatial transform on the transform coefficients, and a motion compensation unit for performing motion compensation on predicted frames according to motion data provided by the entropy decoding unit.

In still another aspect of the present invention, there is provided a color space scalable video decoder, which includes a bit stream preprocessing unit for acquiring information on the color depth capacity from a display device and generating a second bit stream by truncating bits from an input bit stream that exceed the color depth capacity according to the information on the color depth capacity, an entropy decoding unit for decoding the second bit stream, an inverse quantization unit for generating transform coefficients by performing an inverse quantization on the decoded second bit stream, an inverse spatial transform unit for restoring a residual signal by performing an inverse spatial transform on the transform coefficients, and a motion compensation unit for performing motion compensation on predicted frames according to motion data provided by the entropy decoding unit.

In still another aspect of the present invention, there is provided a method of transferring data of a slice that contains a plurality of macroblocks, which includes the steps of inserting luminance data of all the macroblocks contained in the slice, inserting chrominance data of all the macroblocks contained in the slice, transferring a bitstream that includes the luminance data and the chrominance data.

In still another aspect of the present invention, there is provided a method of generating a video sequence that includes a plurality of slices containing a plurality of macroblocks with luminance data and chrominance data of the macroblocks, which includes the steps of inserting the luminance data of all the macroblocks included in the slice, inserting the chrominance data of all the macroblocks included in the slice.

In still another aspect of the present invention, there is provided a method of processing a video sequence that is transferred separately with luminance data or chrominance data of the plurality of macroblocks included in a slice, which includes the steps of interpreting the luminance data of all the macroblocks included in the slice, interpreting the chrominance data of all the macroblocks included in the slice.

In still another aspect of the present invention, there is provided a method of decoding a video sequence that includes a base layer and an FGS enhancement layer, which includes the steps of, interpreting data of the base layer, interpreting the luminance data of all the macroblocks included in the FGS enhancement layer, interpreting the chrominance data of all the macroblocks, combining the luminance data and the chrominance data of the FGS enhancement layer with the data of the base layer; and decoding the combined data.

BRIEF DESCRIPTION OF THE DRAWINGS

The above and other aspects, features and advantages of the present invention will become more apparent from the following detailed description taken in conjunction with the accompanying drawings, in which:

FIG. 2 is a view illustrating the structure of a color space scalable bit stream according to an exemplary embodiment of the present invention;

FIG. 3 is a view illustrating the structure of a color space scalable bit stream in a multilayer structure according to an exemplary embodiment of the present invention;

FIG. 4 is a view illustrating the structure of a color space scalable bit stream in an FGS layer structure according to an exemplary embodiment of the present invention;

FIG. 5 is a view illustrating the structure of a color space scalable bit stream in an FGS layer structure according to another exemplary embodiment of the present invention;

DETAILED DESCRIPTION OF THE EXEMPLARY EMBODIMENTS

Figure 1:
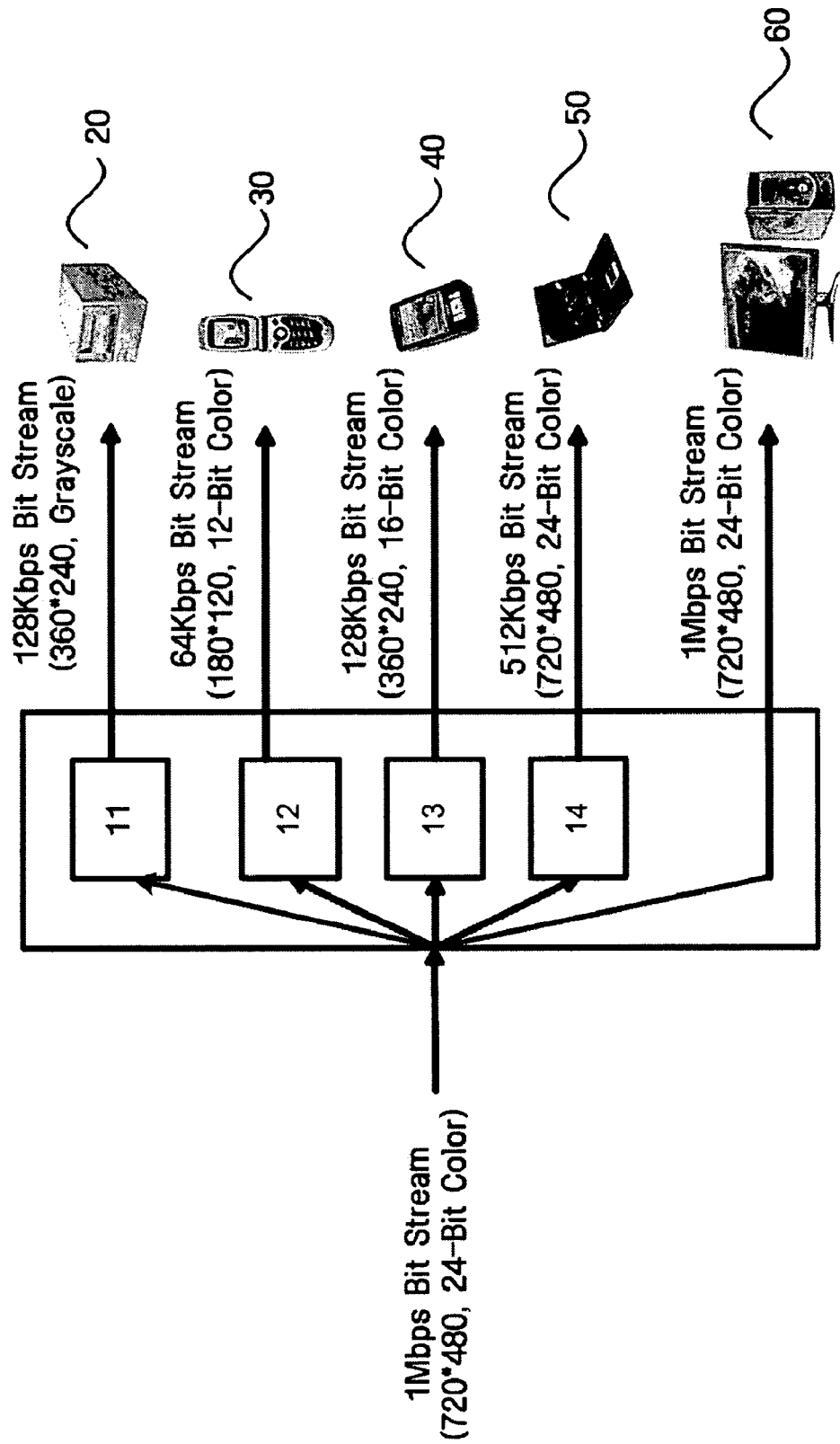
FIG. 1 is an exemplary view illustrating the concept of a color space scalable video coding according to an exemplary embodiment of the present invention.

Hereinafter, exemplary embodiments of the present invention will be described in detail with reference to the accompanying drawings. The aspects and features of the present invention and methods for achieving the aspects and features will become apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the whole description of the present invention, the same drawing reference numerals are used for the same elements across various figures.

FIG. 1 is an exemplary view illustrating the concept of a color space scalable video coding according to an exemplary embodiment of the present invention.

A security system 20 not only displays a video in real time but also stores video data for further use. The storage of video data requires a large disk space, and if the video data is stored as a grayscale image rather than a color image, the disk space for storing the image can be reduced. Accordingly, it is necessary to provide a function for transforming a color image into a grayscale image according to the requirements of a display device. This function is hereinafter referred to as "color component scalability".

On the other hand, one bit stream transmitted from an encoder side may be scaled in color depth and be transmitted to various clients. Generally, a mobile phone 30 and a PDA 40 provide color depths lower than those of a notebook computer 50 and a PC 60. The function for scaling the same bit stream for display devices that support diverse color depths is called "color depth scalability".

Hereinafter, both the color component scalability and the color depth scalability described above are called color space scalability. This color space scalability can be implemented by pre-decoders or extractors 11 to 14.

Since most digital video applications display color video, a mechanism that captures and represents color information is required. A black/white image requires only one numeral to represent the luminance of a respective spatial sample. By contrast, a color image requires at least three numerals for each pixel in order to accurately represent the color. A color space is selected to represent the luminance and the color. The color space may be classified into an RGB color space, a YUV color space and a YCrCb color space. In the RGB color space, a color image sample is represented by three numerals that indicate relative ratios of red, green and blue. Since the three colors are equally important in the RGB color space, they are stored with the same resolution. However, the human visual system is more sensitive to luminance than chrominance, and thus the color image can be represented more efficiently by separating the luminance information from the color information, and representing the luminance data with a higher resolution than that of the chrominance data.

The YCrCb color space and the YUV color space, which is a modification of the YCrCb color space, are popular methods for effectively representing a color image by considering the human visual system, as described above. Y denotes a luminance component, and can be calculated as a weighted average of R, G and B as in Equation (1), $$Y = k_r R + k_g G + k_b B \quad (1)$$

where, k is a weighting factor.

The color information can be expressed by chrominance components, and the respective chrominance component can be expressed by the difference between R (or G or B) and Y as in Equation (2).

$$Cb = B - Y$$

$$Cr = R - Y \quad (2)$$

$$Cg = G - Y$$

Accordingly, by separating the luminance component and the chrominance components from each other, and encoding the separated components, a color bit stream can be transformed into a grayscale bit stream.

FIG. 2 is a view illustrating the structure of a color component scalable bit stream in which a luminance component and chrominance components are separated from each other and encoded according to an exemplary embodiment of the present invention.

Referring to FIG. 2, luminance data 230 is first encoded and then chrominance data 240 is encoded. In a bit stream, position information of the luminance data 230 is inserted into a header 210. The position information of the luminance data may include the entire length of texture data and the length of the luminance data. In addition, the position information of the luminance data may include any types of information which indicate the position of the luminance data that can be truncated by a decoder. The position information of the luminance data can be inserted into a GOP (Group Of Pictures) header, a picture header, a slice header, or any proper position in the bit stream.

The decoder can restore grayscale video frames by extracting only a luminance component from a color bit stream. However, in an exemplary embodiment of the present invention, through a very simple implementation of the decoder, the color component scalability can be achieved, but the color depth scalability cannot be.

The color depth scalability refers to a function required by a decoder of a display device that cannot display the image with resolution of 24 bits, e.g., a PDA or a mobile phone. Accordingly, the decoder must provide a bit stream that uses the color depth suitable to the respective display device. Resources, such as bandwidth and decoding time, are wasted when the display device, such as the PDA or mobile phone, processes a bit stream having a complete color depth.

The color depth scalability can be achieved by making the decoder acquire information from the client on the color depth capacity supported by a client, and then removing bits that exceed the color depth capacity supported by the client from the bit stream. The implementation of the color depth scalability will be explained with reference to FIGS. 3 and 4.

FIG. 3 is a view illustrating the structure of a color space scalable bit stream for providing color component scalability and color depth scalability using a multilayer structure according to an exemplary embodiment of the present invention.

In FIG. 3, the color component scalability and the color depth scalability are provided in a multilayer structure. In an exemplary embodiment of the present invention, the bit stream includes a plurality of layers that include texture data having different color depths. Specifically, the first layer may include texture data that supports a 12 bit color depth, the second layer may include texture data that supports a 16 bit color depth, and the third layer may include 24 bits of texture data. If an encoder encodes and transmits the texture data having different color depths using the multilayer structure, a decoder acquires information on the color depth scalability supported by the display device, removes the bit stream of the layer that exceeds the supportable color depth capacity from the received bit streams, and then decodes the remaining bit streams to restore the video frames. For example, if the display device is a PDA that supports a 16 bit color depth, the decoder removes the bit stream corresponding to the third layer, and decodes the bit streams corresponding to the first layer and the second layer in order to display the decoded bit streams.

On the other hand, the bit stream corresponding to the respective layer includes position information 310 and 340 of luminance data for discriminating luminance data 320 and 350 from chrominance data 330 and 360 in the respective layer, and thus the color component scalability can be realized in the respective layer. Accordingly, in the case where the display device supports a 16 bit color depth and grayscale, the decoder can restore the video frames by truncating the bit stream corresponding to the third layer and truncating the unnecessary chrominance data 330 and 360 according to the position information 310 and 340 of the luminance data of the first and second layers. The position information of the luminance data can be inserted into a GOP header, a picture header, a slice header, or any proper position in the bit stream. The position information of the luminance data may include the entire length of the texture data and the length of the luminance data. In addition, the position information of the luminance data may include any types of information which can indicate the position of the luminance data that can be truncated by the decoder.

In another exemplary embodiment of the present invention, the structure of the bit stream that can support both the color component scalability and the color depth scalability is exemplified. However, if only the color depth scalability using the multilayer structure is to be supported, the position information 310 and 340 of the luminance data of the respective layer can be omitted.

FIG. 4 is a view illustrating the structure of a color space scalable bit stream in an FGS (Fine Grain SNR scalability) layer structure according to an exemplary embodiment of the present invention. In FIG. 4, the color component scalability and the color depth scalability are provided in a FGS layer structure. The FGS technique is for implementing SNR scalability, which is for decoding an input video into two layers having the same frame rate and resolution and different accuracies of quantization. In particular, the FGS technique encodes the input video into two layers, i.e., a base layer and an enhanced layer, and encodes a residual signal of the enhanced layer. The FGS technique may or may not transmit the encoded signals so as to prevent the encoded signals from being decoded by a decoder according to the network transmission efficiency or the state of the decoder side. Accordingly, the data can be properly transmitted with its amount adjusted according to the transmission bit rate of the network.

FGS of the SVM (Scalable Video Model) 3.0 is implemented using a gradual refinement representation. The SNR scalability in FGS can be achieved by making it possible to truncate network abstraction layer (NAL) units generated as the result of FGS encoding in any place. FGS is composed of a base layer and an FGS enhanced layer. The base layer generates base layer frames that represent a minimum quality of the video that can be transmitted at the lowest transmission bit rate, and the FGS enhanced layer generates the NAL units that may be properly truncated and transmitted at a bit rate higher than the lowest transmission bit rate, or which may be properly truncated and decoded by the decoder. The FGS enhanced layer transforms and quantizes a residual signal obtained by subtracting the restored frames, which have been obtained in the base layer or the lower enhanced layer, from the original frames to transmit the quantized residual signal to the decoder. As the layer becomes an upper layer, the SNR scalability can be realized by generating a more exquisite residual by reducing quantization parameter values.

In this exemplary embodiment of the present invention, the color depth scalability is realized using three FGS layers, i.e., a first FGS layer (base layer), a second FGS layer (a first FGS enhanced layer), and a third FGS layer (a second FGS enhanced layer).

Generally, in the FGS layer structure of SVM 3.0, if the number of layers is increased by one, the number of bits that can be used for the texture data is also increased by one. By using this to increase the color depth capacity, the second FGS layer can support the color depth that is one bit larger than that of the first FGS layer, and the third FGS layer can support the color depth that is one bit larger than that of the second FGS layer. If the encoder encodes and transmits the texture data having different color depths using the FGS layer structure, the decoder acquires information on the color depth scalability supported by the display device, removes the bit stream of the layer that exceeds the supportable color depth capacity from the received bit streams, and then decodes the remaining bit streams to restore the video frames.

In this exemplary embodiment of the present invention, the bit stream may include position information 410 of the luminance data for discriminating the luminance data 420, 440 and 460 in all the FGS layers from chrominance data 430, 450 and 470 in order to support the color component scalability. Accordingly, if the display device supports the color depth corresponding to the second FGS layer and grayscale, the decoder can restore the video frames by truncating the bit stream corresponding to the third layer and truncating the unnecessary chrominance data 430 and 450 according to the position information 410 of the luminance data of the first and second layers. The position information of the luminance data can be inserted into a GOP header, a picture header, a slice header, or any proper position in the bit stream. In the exemplary embodiment of the present invention, the position information of the luminance data may include the entire length of the texture data and the length of the luminance data. In addition, the position information of the luminance data may include any type of information that can indicate the position of the luminance data that can be truncated by the decoder.

In this exemplary embodiment of the present invention, the structure of the bit stream that can support both the color component scalability and the color depth scalability is exemplified. However, if only the color depth scalability using FGS is to be supported, the position information 410 of the luminance data of the respective FGS layer can be omitted.

FIG. 5 is a view illustrating the structure of a color space scalable bit stream in an FGS layer structure according to another exemplary embodiment of the present invention.

In this exemplary embodiment as illustrated in FIG. 5, the bit stream has a structure for color space scalable coding and decoding using FGS, in the same manner as the structure of FIG. 4. However, the exemplary embodiment as illustrated in FIG. 4 provides a structure that includes texture data composed of luminance data and chrominance data in the order of FGS layers, while the exemplary embodiment as illustrated in FIG. 5 provides a structure in which luminance data 520 to 540 of all FGS layers are separated from the chrominance data 550 to 570 of all FGS layers, and arranged at the head of the bit stream. In this exemplary embodiment of the present invention, the color depth scalability and the color component scalability are realized using three FGS layers, i.e., a first FGS layer (base layer), a second FGS layer (a first FGS enhanced layer), and a third FGS layer (a second FGS enhanced layer). The decoder acquires information on the color depth scalability supported by the display device, removes the bit stream of the layer that exceeds the supportable color depth capacity from the received bit streams, and then decodes the remaining bit streams to restore the video frames. In particular, in this exemplary embodiment of the present invention, the bit stream may include position information 510 of a boundary between the luminance data 540 and the chrominance data 550 in order to support the color component scalability. In this case, since the maximum luminance data can be used by giving up the chrominance data, a grayscale image having a high sharpness can be restored.

Figure 6:
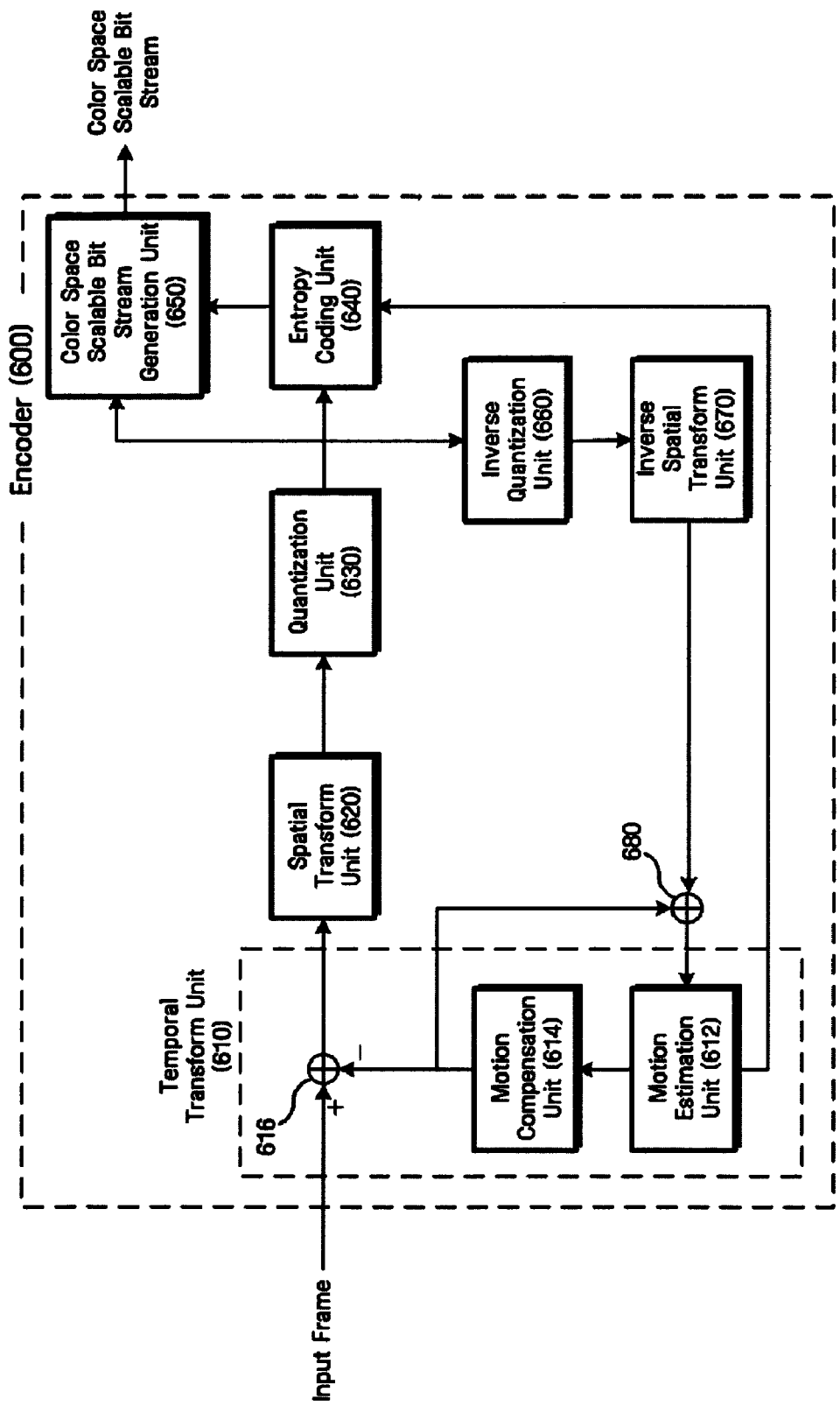
FIG. 6 is a block diagram illustrating the construction of a color space scalable video encoder according to an exemplary embodiment of the present invention.

FIG. 6 is a block diagram illustrating the construction of a color space scalable video encoder according to an exemplary embodiment of the present invention.

Referring to FIG. 6, the color space scalable video encoder 600 according to this exemplary embodiment of the present invention includes a temporal transform unit 610, a spatial transform unit 620, a quantization unit 630, an entropy coding unit 640, a color space scalable bit stream generation unit 650, an inverse quantization unit 660, and an inverse spatial transform unit 670. The temporal transform unit 610 may include a motion estimation unit 612, a motion compensation unit 614, and a subtracter 616.

The motion estimation unit 612 performs motion estimation on the present frame based on the reference frame in input video frames, and obtains motion vectors. The algorithm that is widely used for the motion estimation is a block matching algorithm. This block matching algorithm estimates a displacement that corresponds to the minimum error as a motion vector as it moves a given motion block in the unit of a pixel in a specified search area of the reference frame. For the motion estimation, a motion block having a fixed size or a motion block having a variable size according to a hierarchical variable size block matching (HVSBM) algorithm may be used. The motion estimation unit 612 provides motion data such as motion vectors obtained as the results of motion estimation, the size of the motion block, and the reference frame number to the entropy coding unit 640.

The motion compensation unit 614 reduces the temporal redundancy of the input video frame. In this case, the motion compensation unit 614 generates a temporally predicted frame for the present frame by performing motion compensation for the reference frame using the motion vectors calculated in the motion estimation unit 612.

The subtracter 616 removes the temporal redundancy of the video by subtracting the temporally predicted frame from the present frame.

The spatial transform unit 620 removes spatial redundancy from the frame, from which the temporal redundancy has been removed by the subtracter 616, using a spatial transform method that supports the spatial scalability. The discrete cosine transform (DCT), the wavelet transform, and others, may be used as the spatial transform method. Coefficients obtained as the result of the spatial transform are called transform coefficients. If the DCT is used as the spatial transform method, the resultant coefficients are called DCT coefficients, while if the wavelet transform is used, the resultant coefficients are called wavelet coefficients.

The quantization unit 630 quantizes the transform coefficients obtained by the spatial transform unit 620. Quantization means representing the transform coefficients, which are expressed as real values, by discrete values by dividing the transform coefficients into specified sections and then matching the discrete values to specified indexes. In particular, in the case of using the wavelet transform as the spatial transform method, an embedded quantization method is mainly used as the quantization method. This embedded quantization method performs an efficient quantization using the spatial redundancy by preferentially coding components of the transform coefficients that exceed a threshold value by changing the threshold value (to ½). The embedded quantization method may be an embedded zerotrees wavelet algorithm (EZW), a set partitioning in hierarchical trees algorithm (SPIHT), or an embedded zeroblock coding algorithm (EZBC).

The entropy coding unit 640 performs a lossless coding of the transform coefficients quantized by the quantization unit 630 and motion data provided by the motion estimation unit 612, and generates an output bit stream. Arithmetic coding or variable length coding may be used as the lossless coding method.

The color space scalable bit stream generation unit 650 inserts position information of luminance data in texture data provided by the quantization unit 630 into the bit stream provided by the entropy coding unit 640 in a proper form. The form of the bit stream generated by the color space scalable bit stream generation unit 650 is as described above with reference to FIG. 2.

In another exemplary embodiment of the present invention, the color space scalable bit stream generation unit 650 may first insert the position information of the luminance data into the header of the texture data quantized by the quantization unit 630, not into the header of the entire bit stream, to provide the texture data to the entropy coding unit 640. In this case, a decoder side 700 can extract the position information of the luminance data from the header of the texture data after decoding the bit stream.

In the case where the video encoder 600 supports a closed-loop video encoder in order to reduce a drifting error occurring between the encoder side and the decoder side, it may further include an inverse quantization unit 660 and an inverse spatial transform unit 670.

The inverse quantization unit 660 performs inverse quantization on the coefficients quantized by the quantization unit 630. This inverse quantization process corresponds to the inverse process of the quantization process.

The inverse spatial transform unit 670 performs an inverse spatial transform on the results of the inverse quantization, and provides the results of the inverse spatial transform to an adder 680.

The adder 680 restores the video frame by adding the residual frame provided by the inverse spatial transform unit 670 to the previous frame provided by the motion compensation unit 614 and stored in a frame buffer (not illustrated), and provides the restored video frame to the motion estimation unit 612 as the reference frame.

With reference to FIG. 6, a single layer video encoder has been explained. However, it will be apparent to those skilled in the art that the video encoder according to the present invention can be extended to a color space scalable video coding using a multilayer structure as illustrated in FIG. 3.

Figure 7:
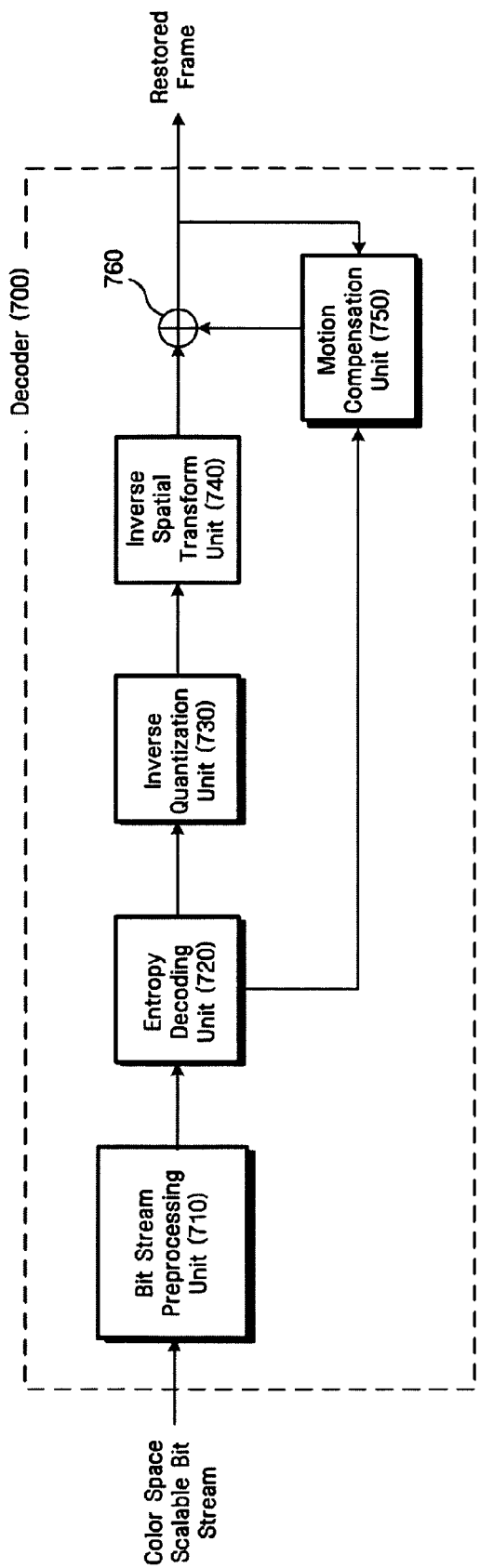
FIG. 7 is a block diagram illustrating the construction of a color space scalable video decoder according to an exemplary embodiment of the present invention.

FIG. 7 is a block diagram illustrating the construction of a color space scalable video decoder according to an exemplary embodiment of the present invention.

Referring to FIG. 7, the color space scalable video decoder 700 according to this exemplary embodiment of the present invention includes a bit stream preprocessing unit 710, an entropy decoding unit 720, an inverse quantization unit 730, an inverse spatial transform unit 740, and a motion compensation unit 750.

The bit stream preprocessing unit 710 acquires information on a supportable color space from the display device, truncates the received bit stream according to the color space information, and provides the truncated bit stream to the entropy decoding unit 720. The information on the color space supported by the display device may be information on the displayed color/grayscale image, the color depth capacity, and others.

In the case where the display device supports only the grayscale image as described above with reference to FIGS. 2 and 3, the bit stream preprocessing unit 710 extracts the position information of the luminance data from the bit stream, truncates a part corresponding to the chrominance data from the texture data, and provides the bit stream that includes only the motion data and the luminance data to the entropy decoding unit 720. Also, the bit stream preprocessing unit 710 may truncate bits or a layer that exceed the color depth capacity supported by the display device, and provide the remaining bit stream to the entropy decoding unit 720.

In another exemplary embodiment of the present invention, without the preprocessing by the bit stream preprocessing unit 710, the entropy decoding unit 720 may extract the position information of the luminance data included in the header part of the texture data and truncate the chrominance data, if needed, after decoding the received bit stream and extracting the texture data.

The entropy decoding unit 720 extracts motion data and texture data by performing the lossless decoding that is to the inverse of the entropy encoding. The entropy decoding unit 720 provides the extracted texture data to the inverse quantization unit 730, and provides the extracted motion data to the motion compensation unit 750.

The inverse quantization unit 730 performs inverse quantization on the texture data transmitted from the entropy decoding unit 720. This inverse quantization process is to search for quantized coefficients that match values expressed by specified indexes and transferred from the encoder side 600. A table that represents a mapping between indexes and quantization coefficients may be transferred from the encoder side 600, or may be prepared in advance by an agreement between the encoder and the decoder.

The inverse spatial transform unit 740 inversely performs the spatial transform and restores the coefficients generated as the results of the inverse quantization to the residual image in a spatial domain. For example, if the coefficients have been spatially transformed by a wavelet transform method in the video encoder side, the inverse spatial transform unit 740 will perform the inverse wavelet transform, while if the coefficients have been transformed by a DCT transform method in the video encoder side, the inverse spatial transform unit will perform the inverse DCT transform.

The motion compensation unit 750 performs motion compensation of the restored video frames and generates motion compensated frames using the motion data provided by the entropy decoding unit 720. Of course, this motion compensation process can be performed only when the present frame is decoded through the temporal prediction process on the encoder side.

An adder 760 restores the video frames by adding the residual image to the motion compensated frames provided by the motion compensation unit 750 when the residual image restored by the inverse spatial transform unit is generated by a temporal prediction.

Figure 8:
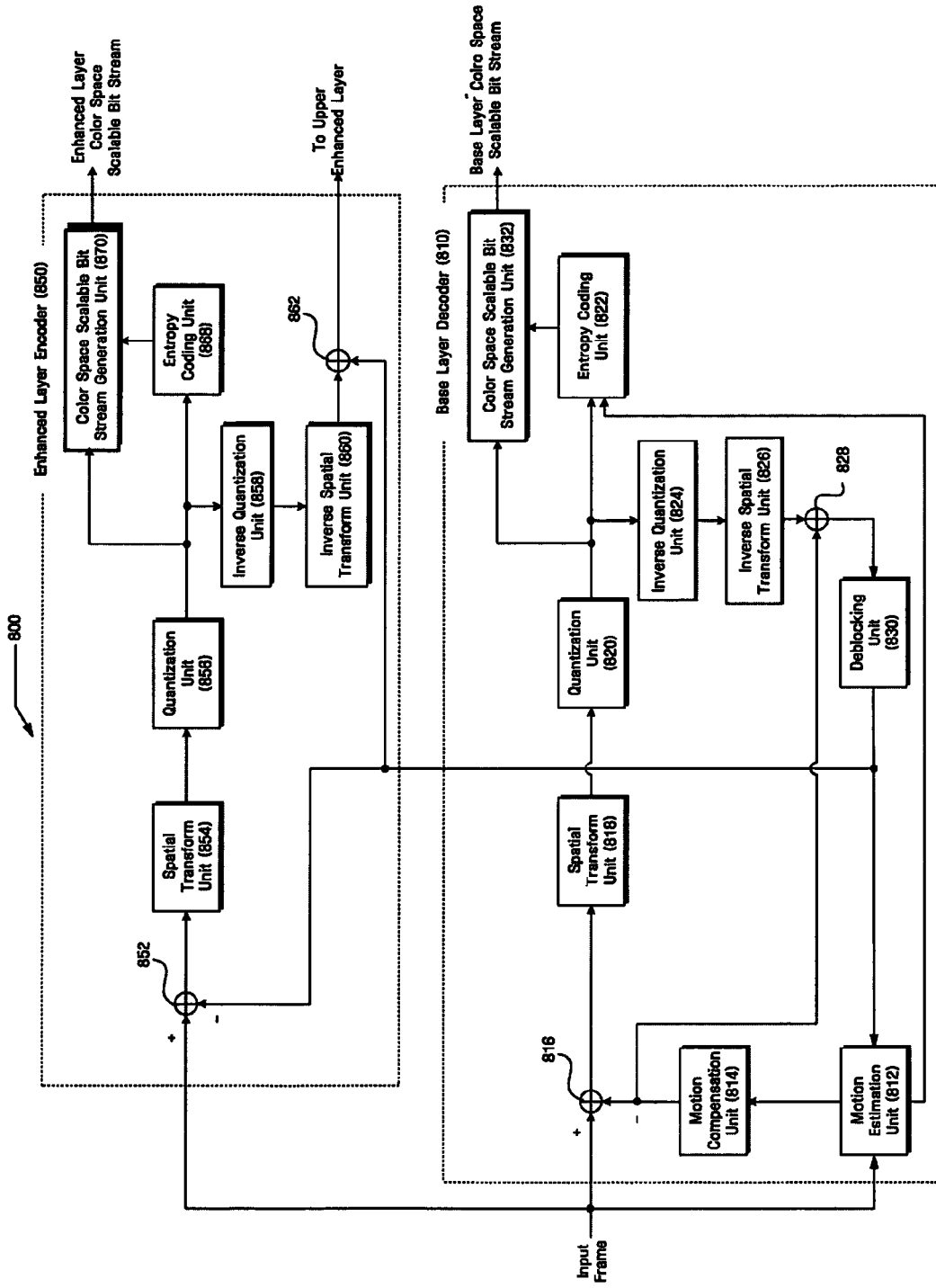
FIG. 8 is a block diagram illustrating the construction of a color space scalable video encoder in an FGS layer structure according to an exemplary embodiment of the present invention.

FIG. 8 is a block diagram illustrating the construction of a color space scalable video encoder in an FGS layer structure according to an exemplary embodiment of the present invention.

Referring to FIG. 8, the encoder according to this exemplary embodiment of the present invention may briefly include a base layer encoder 810 and an enhancement layer encoder 850. In this exemplary embodiment of the present invention, it is exemplified that a base layer and an enhancement layer are used. However, it will be apparent to those skilled in the art that the present invention can be also applied to cases where more layers are used.

The base layer encoder 810 may include a motion estimation unit 812, a motion compensation unit 814, a spatial transform unit 818, a quantization unit 820, an entropy coding unit 822, a color space scalable bit stream generation unit 832, an inverse quantization unit 824, an inverse spatial transform unit 826 and a deblocking unit 830.

The motion estimation unit 812 performs motion estimation of the present frame based on the reference frame among input video frames, and obtains motion vectors. In this exemplary embodiment of the present invention, the motion vectors for prediction are obtained by receiving the restored frame that has been deblocked by the deblocking unit 830. The motion estimation unit 812 provides motion data such as motion vectors obtained as the result of motion estimation, the size of the motion block, and the reference frame number to the entropy coding unit 822.

The motion compensation unit 814 generates a temporally predicted frame for the present frame by performing motion compensation for a forward or backward reference frame using the motion vectors calculated by the motion estimation unit 812.

The subtracter 816 removes temporal redundancy of the video by subtracting the temporally predicted frame provided by the motion compensation unit 814 from the present input frame.

The quantization unit 820 quantizes the transform coefficients obtained by the spatial transform unit 818.

The entropy coding unit 822 performs lossless coding of the transform coefficients quantized by the quantization unit 820 and the motion data provided by the motion estimation unit 812, and generates an output bit stream.

The color space scalable bit stream generation unit 832 inserts the position information of the luminance data among the texture data provided by the quantization unit 820 into the bit stream provided by the entropy coding unit 822 in a proper form. The form of the bit stream generated by the color space scalable bit stream generation unit 832 is as described above with reference to FIGS. 4 and 5.

In another exemplary embodiment of the present invention, the color space scalable bit stream generation unit 832 may first insert the position information of the luminance data into the header part of the texture data quantized by the quantization unit 820, not into the header part of the entire bit stream, to provide the texture data to the entropy coding unit 822. In this case, a decoder side 900 can extract the position information of the luminance data from the header of the texture data after decoding the bit stream.

In the case where the video encoder 800 supports a closed-loop video encoder in order to reduce a drifting error occurring between the encoder side and the decoder side, it may further include an inverse quantization unit 824 and an inverse spatial transform unit 826.

The deblocking unit 830 receives the restored video frames from an adder 828 and performs deblocking to remove artifacts caused due to boundaries among blocks in the frame. The deblocked restored video frame is provided to an enhancement layer encoder 850 as the reference frame.

The enhancement layer encoder 850 may include a spatial transform unit 854, a quantization unit 856, an entropy coding unit 868, an inverse quantization unit 858, and an inverse spatial transform unit 860 and a deblocking unit.

A color space scalable bit stream generation unit 870 inserts the position information of the luminance data among the texture data provided by the quantization unit 856 into the bit stream provided by the entropy coding unit 868 in a proper form. The form of the bit stream generated by the color space scalable bit stream generation unit 870 is as described above with reference to FIGS. 4 and 5.

In another exemplary embodiment of the present invention, the color space scalable bit stream generation unit 870 may first insert the position information of the luminance data into the header part of the texture data quantized by the quantization unit 856, not into the header part of the entire bit stream, to provide the texture data to the entropy coding unit 868. In this case, a decoder side 900 can extract the position information of the luminance data from the header of the texture data after decoding the bit stream.

A subtracter 852 generates a residual frame by subtracting the reference frame provided by the base layer from the present input frame. The residual frame is encoded through the spatial transform unit 854 and the quantization unit 856, and is restored through the inverse quantization unit 858 and the inverse spatial transform unit 860.

An adder 862 generates a restored frame by adding the restored residual frame provided by the inverse spatial transform unit 860 to the reference frame provided by the base layer. The restored frame is provided to an upper enhanced layer as the reference frame.

Since the operations of the spatial transform unit 854, the quantization unit 856, the entropy coding unit 868, the inverse quantization unit 858 and the inverse spatial transform unit 860 are the same as those of the base layer, an explanation thereof has been omitted.

Although it is exemplified that a plurality of constituent elements having the same names with different identification numbers exist in FIG. 8, it will be apparent to those skilled in the art that one constituent element can operate in both the base layer and the enhancement layer.

Figure 9:
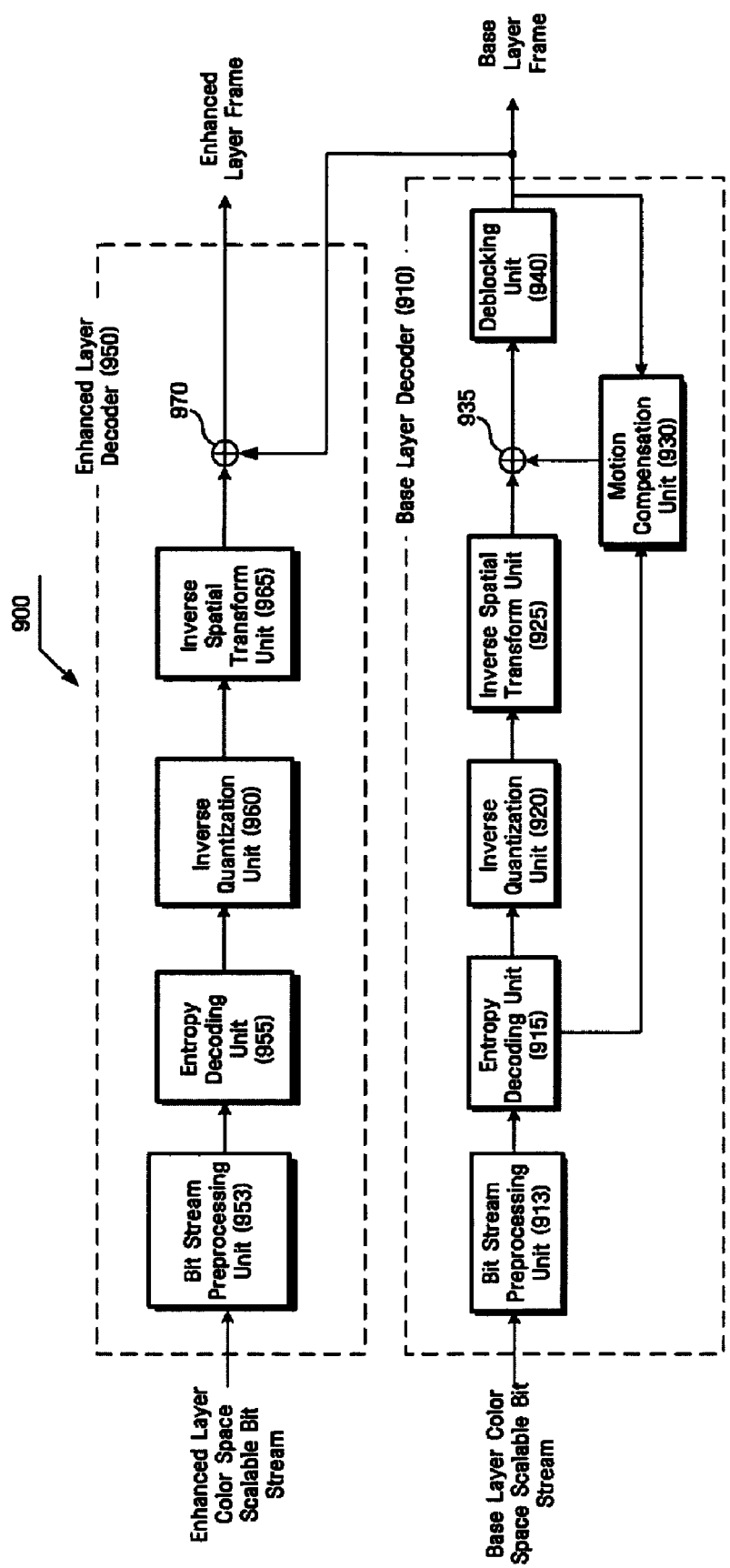
FIG. 9 is a block diagram illustrating the construction of a color space scalable video decoder in an FGS layer structure according to an exemplary embodiment of the present invention.

FIG. 9 is a block diagram illustrating the construction of a color space scalable video decoder in an FGS layer structure according to an exemplary embodiment of the present invention.

Referring to FIG. 9, the video decoder 900 may include a base layer decoder 910 and an enhancement layer decoder 950.

The enhancement layer decoder 950 may include a bit stream preprocessing unit 953, an entropy decoding unit 955, an inverse quantization unit 960 and an inverse spatial transform unit 965.

The bit stream preprocessing unit 953 acquires information on a supportable color space from the display device, truncates the received bit stream according to the color space information, and provides the truncated bit stream to the entropy decoding unit 955. The information on the color space supported by the display device may be information on the displayed color/grayscale image, the color depth capacity, and others.

The entropy decoding unit 955 extracts the texture data by performing the lossless decoding that is to the inverse of the entropy encoding. The texture information is provided to the inverse quantization unit 960.

The inverse quantization unit 960 performs inverse quantization on the texture data transmitted from the entropy encoding unit 955. The inverse quantization process is to search for the quantized coefficients that match values expressed by specified indexes and transferred from the encoder side 800.

The inverse spatial transform unit 965 inversely performs the spatial transform and restores the coefficients created as the results of the inverse quantization to the residual image in a spatial domain.

An adder 970 restores the video frames by adding the residual image restored by the inverse spatial transform unit to the reference frame provided by the deblocking unit 940 of the base layer decoder.

The base layer decoder 910 may include a bit stream preprocessing unit 913, an entropy decoding unit 915, an inverse quantization unit 920, an inverse spatial transform unit 925, a motion compensation unit 930 and a deblocking unit 940.

The bit stream preprocessing unit 913 acquires information on a supportable color space from the display device, truncates the received bit stream according to the color space information, and provides the truncated bit stream to the entropy decoding unit 915. The information on the color space supported by the display device may be information on the displayed color/grayscale image, the color depth capacity, and others.

The entropy decoding unit 915 extracts the texture data and motion data by performing the lossless decoding that is reverse to the entropy encoding. The texture information is provided to the inverse quantization unit 920.

The motion compensation unit 930 performs motion compensation of the restored video frame using the motion data provided by the entropy decoding unit 915 and generates a motion compensated frame. This motion compensation process is applied only to the case where the present frame has been encoded through a temporal predication process in the encoder side.

An adder 935 restores the video frame by adding the residual image to the motion compensated image provided by the motion compensation unit 930 when the residual image restored by the inverse spatial transform unit 925 is generated by the temporal prediction.

The deblocking unit 940, which corresponds to the deblocking unit 830 of the base layer encoder as illustrated in FIG. 8, generates the base layer frame by deblocking the restored video frame from the adder 935, and provides the base layer frame to the adder 970 of the enhancement layer decoder 950 as the reference frame.

Since the operations of the inverse quantization unit 920 and the inverse spatial transform unit 925 are the same as those existing in the enhancement layer, the repeated explanation thereof will be omitted.

Although it is exemplified that a plurality of constituent elements having the same names with different identification numbers exist in FIG. 9, it will be apparent to those skilled in the art that one constituent element having a specified name can operate in both the base layer and the enhancement layer.

The respective constituent elements as illustrated in FIGS. 6 to 9 are software or hardware such as a field-programmable gate array (FPGA) and a application-specific integrated circuit (ASIC). However, the constituent elements are not limited to the software or hardware. The constituent elements may be constructed so as to reside in an addressable storage medium or to execute one or more processors. The functions provided in the constituent elements may be implemented by subdivided constituent elements, and the constituent elements and functions provided in the constituent elements may be combined together to perform a specified function. In addition, the constituent elements may be implemented so as to execute one or more computers in a system.

Figure 10:
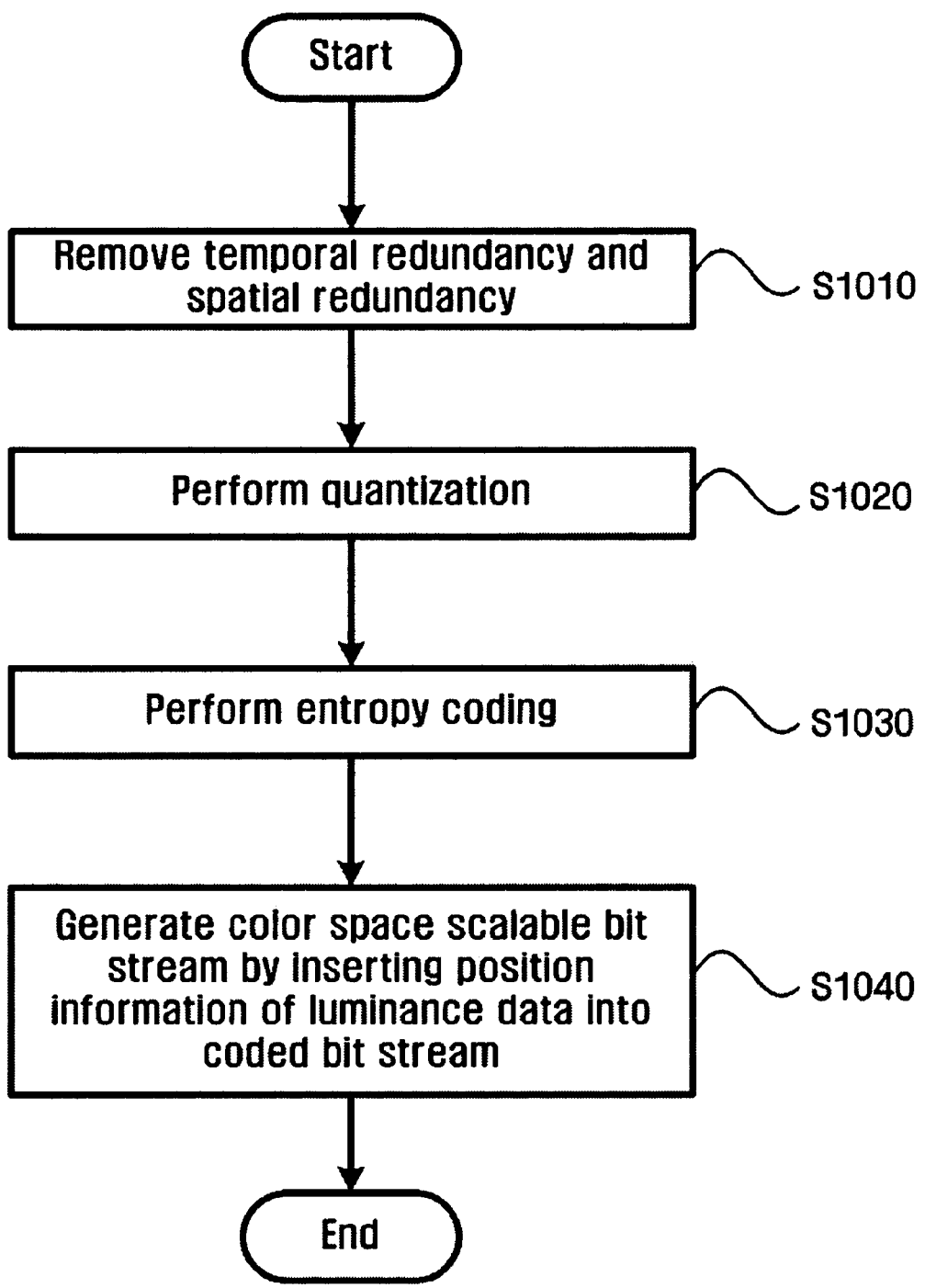
FIG. 10 is a flowchart illustrating an encoding process according to an exemplary embodiment of the present invention.

FIG. 10 is a flowchart illustrating an encoding process according to an exemplary embodiment of the present invention.

Referring to FIG. 10, the temporal transform unit 610 and the spatial transform unit 620 of the video encoder 600 according to an exemplary embodiment of the present invention remove temporal redundancy and spatial redundancy of input video frames S1010. In this case, the spatial redundancy may be removed after the temporal redundancy is removed, or the temporal redundancy may be removed after the spatial redundancy is removed. The quantization unit 630 quantizes transform coefficients generated as the results of removing the temporal redundancy and the spatial redundancy S1020. The entropy coding unit 640 generates a bit stream by encoding the quantized transform coefficients S1030. The color space scalable bit stream generation unit generates a color space scalable bit stream by adding the position information of the luminance data to the entropy-coded bit stream S1040.

Figure 11:
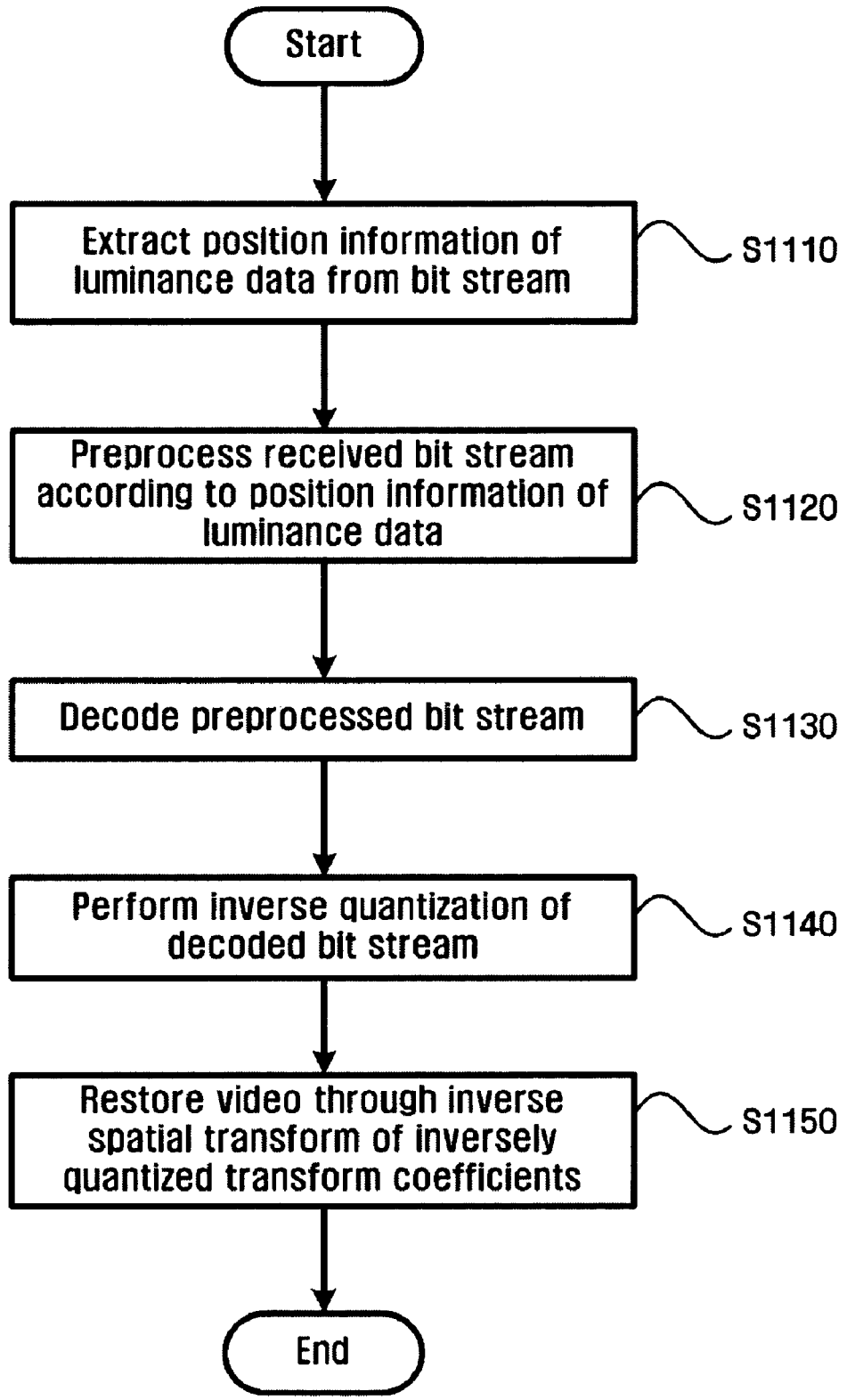
FIG. 11 is a flowchart illustrating a color component scalable video decoding process according to an exemplary embodiment of the present invention.

FIG. 11 is a flowchart illustrating a color component scalable video decoding process according to an exemplary embodiment of the present invention.

Referring to FIG. 11, the bit stream preprocessing unit 710 of the video decoder 700 according to an exemplary embodiment of the present invention extracts the position information of the luminance data from the received bit stream S1110. The bit stream preprocessing unit 710 truncates the chrominance data from the bit stream according to the position information of the luminance data S1120. The entropy decoding unit 720 decodes the preprocessed bit stream S1130, and the inverse quantization unit 730 performs inverse quantization on the decoded bit stream S1140. Then, the inverse spatial transform unit 740 restores the video frame by performing an inverse spatial transform on the inversely quantized bit stream S1150.

Figure 12:
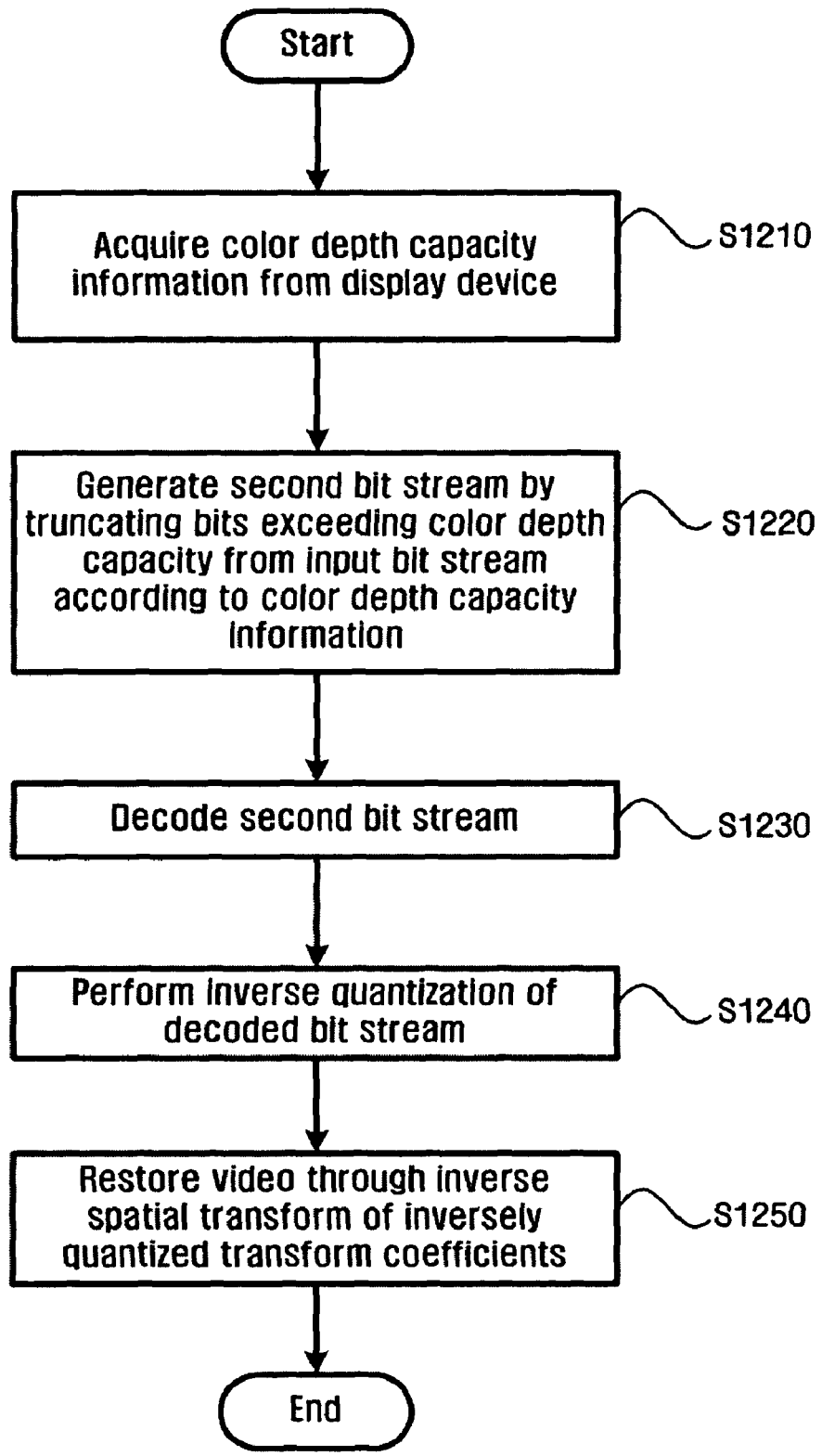
FIG. 12 is a flowchart illustrating a color depth scalable video decoding process according to an exemplary embodiment of the present invention.

FIG. 12 is a flowchart illustrating a color depth scalable video decoding process according to an exemplary embodiment of the present invention.

Referring to FIG. 12, the bit stream preprocessing unit 710 of the video decoder 700 according to an exemplary embodiment of the present invention acquires information on a color depth capacity from a display device S1210, and generates a second bit stream by truncating bits that exceed the color depth capacity from an input bit stream according to the acquired information on the color depth capacity S1220. The entropy decoding unit 720 decodes the second bit stream S1230, and the inverse quantization unit 730 performs inverse quantization on the decoded bit stream S1240. Then, the video is restored when the inverse spatial transform unit 740 restores a residual signal by performing an inverse spatial transform on the transform coefficients and the motion compensation unit performs a motion compensation of predicted frames according to motion data provided by the entropy decoding unit.

As described above, the color space scalable video coding and decoding method according to the present invention produces at least one of the following effects.

First, an encoder can inform a decoder of the position of luminance data in a bit stream, and thus the decoder can transform a color image into a grayscale image, as needed.

Second, the color depth scalability can be achieved in a simple manner by the decoder acquiring information on a color depth capacity from a display device, removing bits that exceed the color depth capacity supported by the display device, and decoding the bit stream.

The exemplary embodiments of the present invention have been described for illustrative purposes, and those skilled in the art will appreciate that various modifications, additions and substitutions are possible without departing from the scope and spirit of the invention as disclosed in the accompanying claims.

What is claimed is:

1. A color space scalable video coding method, the method comprising:
   (a) generating transform coefficients by removing temporal redundancy and spatial redundancy of input video frames;
   (b) quantizing the transform coefficients;
   (c) generating a bit stream by entropy coding the quantized transform coefficients, and
   (d) generating a color space scalable bit stream comprising the bit stream and position information of luminance data in the bit stream,
   wherein the position information of the luminance data is inserted into a header of quantized texture data, and
   wherein the position information of the luminance data comprises a length of texture information in the bit stream, and a length of the luminance data in the texture information,
   wherein the length of texture information in the bit stream corresponds to number of layers in a Fine Grain SNR Scalability (FGS) layer structure.

2. The method as claimed in claim 1, wherein the length of texture information in the bit stream corresponds to one layer.

3. The method as claimed in claim 1, wherein the position information of the luminance data comprises a number of fine granule SNR scalability (FGS) layers, a length of texture information in the bit stream of each respective FGS layer, and a length of the luminance data in the texture information.

4. The method as claimed in claim 1, wherein the entropy-coded bit stream comprises motion data and texture data of a respective input video frame; and
   the texture data comprises luminance data and chrominance data of the input video frame.

5. The method as claimed in claim 1, wherein the quantizing the transform coefficients comprises using quantization parameters that become smaller as a layer level increases.

6. A color space scalable video coding method comprising the steps of:
   (a) generating transform coefficients by removing temporal redundancy and spatial redundancy of input video frames;
   (b) quantizing the transform coefficients;
   (d) generating a color space scalable bit stream which comprises the bit stream and position information of luminance data in the bit stream,
   (e) wherein the position information of the luminance data is inserted into a header of quantized texture data;
   (f) generating color depth scalability based on Fine Grain Signal-to-Noise Ratio scalability (FGS) layer structure, comprising a first FGS layer, a second FGS layer and third FGS layer, and
   wherein a number of bits of a color depth of the bit stream is increased in proportion to an increase of a level of a layer.

7. The method as claimed in claim 6, wherein the quantizing the transform coefficients comprises using quantization parameters that become smaller as a level of a chrominance layer increases.

8. A color space scalable video encoder comprising:
   a temporal transform unit that removes the temporal redundancy of input video frames;
   a spatial transform unit that removes the spatial redundancy of the input video frames;
   a quantization unit that quantizes the transform coefficients generated by the temporal transform unit and the spatial transform unit;
   an entropy coding unit that performs entropy coding of the quantized transform coefficients; and
   a color space scalable bit stream generation unit that generates a color space scalable bit stream that comprises a bit stream generated by the entropy coding unit, and position information of luminance data in the bit stream,
   wherein the position information of the luminance data is inserted into a header of quantized texture data,
   wherein the position information of a luminance data comprises a length of texture information in the bit stream, and a length of the luminance data in the texture information, and wherein the length of texture information in the bit stream corresponds to number of layers in a Fine Grain SNR Scalability (FGS) layer structure.

9. The encoder as claimed in claim 8, wherein the length of texture information in the bit stream corresponds to one layer.

10. The encoder as claimed in claim 8, wherein the position information of the luminance data comprises a number of fine granule SNR scalability (FGS) layers, a length of texture information in the bit stream of each respective FGS layer, and a length of the luminance data in the texture information.

11. The encoder as claimed in claim 8, wherein a number of bits of a color depth increases as a level of a chrominance layer increases in the color space scalable bit stream.

12. A method of transferring data of a slice that contains a plurality of macroblocks, comprising:
(a) inserting position information of luminance data of all the macroblocks contained in the slice into a bitstream and inserting luminance data of all the macroblocks contained in the slice into the bitstream;
(b) alternately inserting chrominance data of all the macroblocks contained in the slice into the bitstream after the inserted position information of the luminance data and between the luminance data,
wherein the position information of the luminance data is inserted into a header of quantized texture data, and
wherein the position information of the luminance data comprises a length of texture information in the bit stream, and a length of the luminance data in the texture information,
wherein the length of texture information in the bit stream corresponds to number of layers in a Fine Grain SNR Scalability (FGS) layer structure;
(c) transferring the bitstream that comprises the inserted position information of the luminance data, the inserted luminance data and the inserted chrominance data,
wherein the slice is included in the fine granule SNR scalability (FGS) layer, and
wherein the plurality of macroblocks do not contain motion vector information.

13. A method of transferring data of a slice that contains a plurality of macroblocks, comprising:
(a) inserting position information of luminance data of all the macroblocks contained in the slice into a bitstream and inserting luminance data of all the macroblocks contained in the slice into the bitstream;
(b) inserting chrominance data of all the macroblocks contained in the slice into the bitstream after the inserted position information of the luminance data and the luminance data,
wherein the position information of the luminance data is inserted into a header of quantized texture data, and
wherein the position information of the luminance data comprises a length of texture information in the bit stream, and a length of the luminance data in the texture information,
wherein the length of texture information in the bit stream corresponds to number of layers in a Fine Grain SNR Scalability (FGS) layer structure;
(c) transferring the bitstream that comprises the inserted position information of the luminance data, the inserted luminance data and the inserted chrominance data, and interpreting position of the luminance data and position of the chrominance data in the slice based on the position information of the luminance data,
wherein the slice is included in the fine granule SNR scalability (FGS) layer.

14. A non-transitory computer readable recording medium storing a computer-readable program which when executed by a computer, performs the method recited in claim 1.

15. A non-transitory computer readable recording medium storing a computer-readable program which when executed by a computer performs the method recited in claim 6.

16. A non-transitory computer readable recording medium storing a computer-readable program which when executed by a computer performs the method recited in claim 12.

* * * * *